United States Patent [19]

Siina

[11] Patent Number: 4,772,776
[45] Date of Patent: Sep. 20, 1988

[54] AUTOMATIC WELDING WITH ARC STRIKING RETRY

[75] Inventor: Tusaka Siina, Narashino, Japan

[73] Assignees: Hitachi, Ltd.; Hitachi Keiyo Engineering Co. Ltd., both of Japan

[21] Appl. No.: 1,165

[22] Filed: Jan. 7, 1987

[30] Foreign Application Priority Data

Jan. 8, 1986 [JP] Japan .................................. 61-570

[51] Int. Cl.⁴ .............................................. B23K 9/06
[52] U.S. Cl. .............................. 219/130.4; 219/125.1; 901/42
[58] Field of Search .......................... 219/125.1, 130.4; 901/42

[56] References Cited

U.S. PATENT DOCUMENTS 4,578,562  3/1986  Linström et al. ................. 219/125.1
4,647,753  3/1987  Nakashima et al. ............. 219/125.1

Primary Examiner—Clifford C. Shaw
Attorney, Agent, or Firm—Fay, Sharpe, Beall, Fagan, Minnich & McKee

[57] ABSTRACT

A welding expectation path is taught beforehand, and an operation for striking an electric arc is executed at a point on the path. If the electric arc does not appear, the operation for striking the electric arc is executed at a different point on the path. When the electric arc has appeared, a welding torch is once returned to a welding start expectation point while the electric arc is held, and it performs welding from the welding start expectation point toward a welding end expectation point.

16 Claims, 3 Drawing Sheets

AUTOMATIC WELDING WITH ARC STRIKING RETRY

BACKGROUND OF THE INVENTION

1. Field of the Invention:

The present invention relates to a method and apparatus for automatic welding along a welding expectation line. More particularly, it provides a measure against a situation in which an electric arc does not strike at a welding start expectation point.

2. Description of the Prior Art:

In such a case where oil adheres to the surface of a workpiece or where the surface of a workpiece is covered with an oxide film, an electric arc sometimes does not strike at a welding start expectation point. In a case where an electric arc has struck at a point different from the welding start expectation point upon moving a welding torch along a welding expectation line, the different point becomes an actual arc start point. Welding from the arc start point to a welding end expectation point is possible. In this case, however, the welding of a section from the welding start expectation point to the arc start point remains unfinished.

SUMMARY OF THE INVENTION

The principal object of the present invention is to provide a method and apparatus for automatically welding the whole section of a continuous welding expectation line.

Another object of the present invention is to provide an apparatus in which, when an electric arc does not appear, operations for striking the electric arc are automatically executed a plurality of times at the different positions of an expected welding line on a workpiece.

Another object of the present invention is to provide an apparatus which automatically stores the number of times of failing to strike an electric arc in spite of operations for striking the electric arc.

Further objects and attendant effects of the present invention will be readily understood from the ensuing description.

The present invention utilizes a robot for causing a welding torch for electric arc welding to progress from a welding start expectation point on a workpiece and along a welding expectation line whose start point is the welding start expectation point. This robot is, operating by teaching data for example, a manually taught robot proper or a program set in a control panel for controlling the robot proper. In the present invention arc starts are executed with a welding wire held in contact with or in proximity to the workpiece in the course of the progression of the welding torch. The execution is repeated until an electric arc is actually struck, but the welding should better be judged impossible when the electric arc does not strike in spite of the repeated execution a prescribed number of times. In a case where an electric arc has not struck at the welding start expectation point and has struck at a somewhat more progressive stage, the stage becomes an actual arc start point. In the present invention, the welding torch retrogresses from the actual arc start point to the welding start expectation point while the electric arc is kept. This is accomplished by teaching data in the robot proper or a program in the control panel for controlling the robot proper, but it differs from the foregoing in that the program for moving the welding torch backward is executed instead of the program for moving the same forward. In the present invention, the welding torch is then made to progress again from the welding start expectation point and along the welding expectation line while the electric arc is kept. With the progression done again, the welding torch progresses to a welding end expectation point beyond the aforementioned arc start point while performing the welding. As a result, a section from the welding expectation start point to the actual arc start point is welded double. Since, however, the whole expected section is welded without extinguishing the electric arc, an undesirable section remaining unwelded does not arise.

DESCRIPTION OF THE PREFERRED EMBODIMENTS

Figure 2:
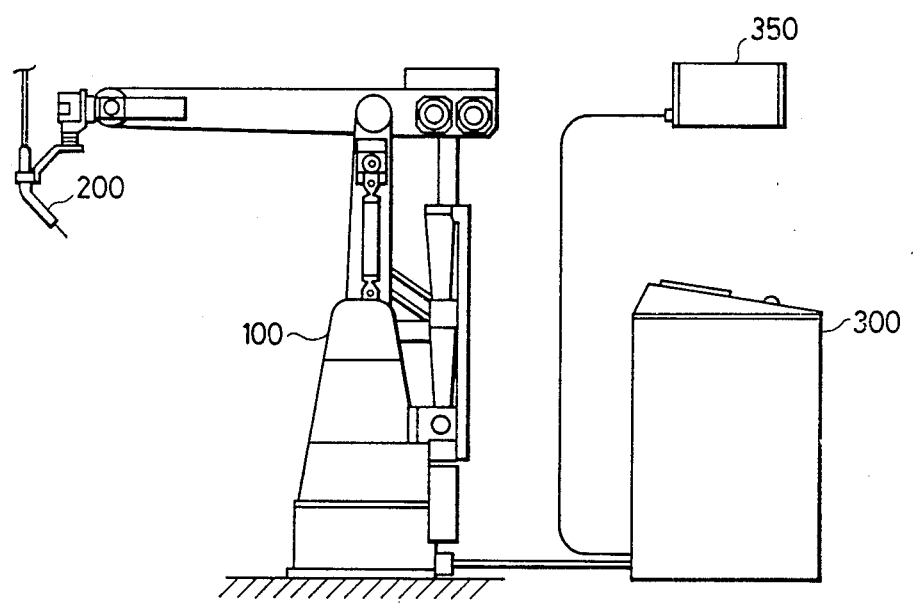
FIG. 2 is a front view of a robot for use in the apparatus.
Figure 3:
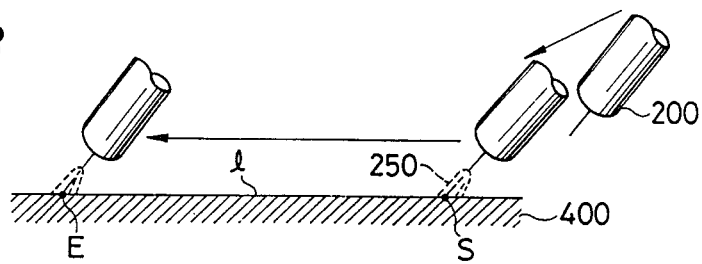
FIG. 3 is an explanatory view showing the welding.

In this embodiment, a robot as shown in FIG. 2 is used. A welding torch 200 for electric arc welding is attached to the wrist of the robot proper 100, and the position and attitude thereof are controlled. A control panel 300 wired to the robot proper 100 or a teaching pendant 350 belonging thereto is used for this control. FIG. 3 illustrates the situation of the electric arc welding. The welding torch 200 is positioned to a welding start expectation point S on a workpiece 400, and progresses therefrom to a welding end expectation point E along a welding expectation line l whose start point is the welding start expectation point S. Simultaneously, the arc welding by an electric arc 250 is performed. Such operations comply with a program which is taught beforehand for the workpiece 400 and which is stored in the memory of the control panel 300.

Figure 1:
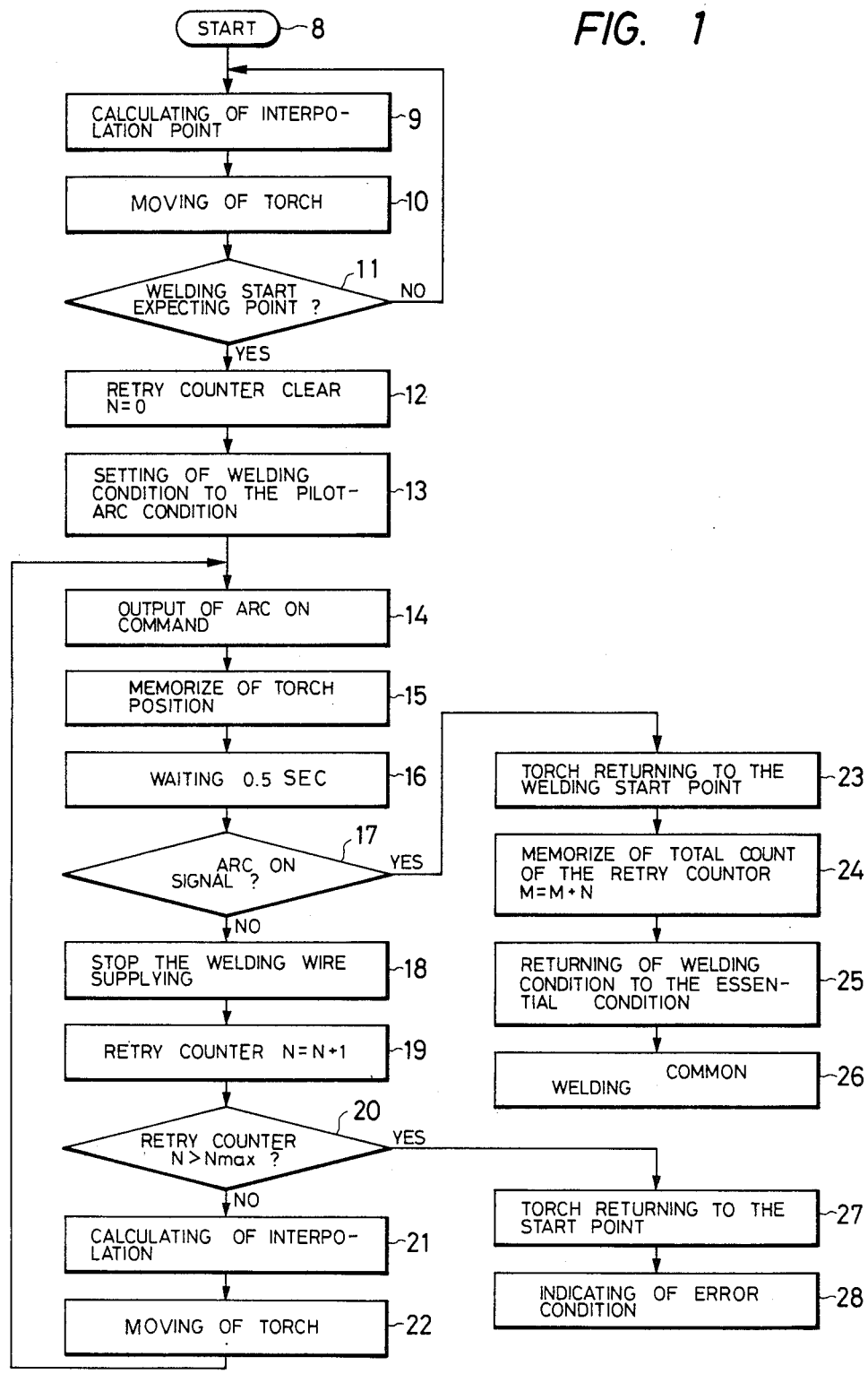
FIG. 1 is a flow chart showing the processing program of an automatic welding apparatus according to the present invention.

FIG. 1 shows as a flow chart of the essential portions of the program, especially the portions concerning an arc retry function. Now, the embodiment will be described along the flow.

The program is started at a step 8, and the operation of a step 9 is executed. This operation of the step 9 is an interpolative calculation for finding interpolation points on a straight line which connects two teaching points previously given and stored in a RAM, not shown, within the control panel 300. Since a method for the interpolative calculation is detailed in the specification of U.S. Pat. No. 4,541,060, it shall be omitted from the description.

At a step 10, the data items of the plurality of interpolation points found at the step 9 are successively applied to the robot proper 100 so as to position the front end of the torch 200 to the teaching points. A step 11 checks if the point of the positioning is registered as the welding start expectation point S. If the positioned point is not the welding start expectation point S, the flow shifts back to the step 9, and the torch is moved to new teaching points. If, at the step 11, the positioned point is the welding start expectation point S, the count N of a retry counter is cleared to 0(zero) at a step 12. At a step 13, a welding condition is set to the condition of a pilot electric arc. The condition of the pilot arc is such that the electric arc to strike is narrowed with respect to the electric arc under a rated welding condition predetermined in the teaching mode for the workpiece, and that the electric arc voltage and/or current are/is set at a somewhat lower value. In addition, both the amount of projection or the rate of supply of a welding wire and the moving speed of the welding torch 200 are correspondingly set at somewhat lower values. At a step 14, an arc-on command is output to a welding machine not shown. At a step 15, the positional data of the welding torch 2000 at that time is stored. If necessary, the attitude data at that time is also stored. At a step 16, the control is caused to wait for 0.5 second, and a step 17 checks if an arc-on signal has got back. The wait for 0.5 second at the step 16 serves to afford a period of time required for bringing back the arc-on signal from the welding machine to the control panel 300 of the robot. The arc-on signal develops owing to the flow of current between the torch 200 and the workpiece 400. When the arc-on signal has not got back, a wire supplying signal is stopped at a step 18. This is intended to prevent the oversupply of the welding wire. At a step 19, the content of the retry counter is incremented by 1(one) into $N=N+1$. At a step 20, whether or not the retry counter content N has exceeded a predetermined value $N_{max}$ is decided. Unless N has exceeded $N_{max}$, an interpolative calculation for advancing the front end of the torch 200 to the next teaching point is performed at a step 21. At the next step 22, the front end of the torch 200 is positioned to the interpolation point found at the step 21. Thenceforth, the processing steps of the step 14 et seq. are repeated. The interval of the interpolation points found at the step 21 is one sampling distance δ, which signifies a length by which the welding torch advances in a unit time in a sampling control, and which is about 0.5-2 mm.

In a case where the arc-on signal has got back at the step 17, the control flow proceeds to a step 23. At a step 23 the welding torch 200 is returned to the original welding start expectation point S while keeping the electric arc. When the arc-on signal has appeared at the welding start expectation point S, the length of the return is null, and the welding torch is not actually returned. The electric arc is kept unextinguished in the return process. This is intended to prevent the re-failure of the electric arc start. At the step 23, the positional data items stored at the step 15 are used by reading them out reversely to the stored order thereof. This is intended to save the labor of calculating a path for the return anew. At the next step 24, the cumulative value M of the retry counter contents N is found as $M=M+N$ and is stored. If the arc start is effected by one try without fail, the retry counter N becomes 0(zero), and the cumulative value counter M does not increment. When the arc starts fail repeatedly, the cumulative value counter M increments on and on. Although the step of resetting the cumulative value counter M to 0(zero) is not illustrated, the cumulating period of time of the cumulative value counter M is set at one day by way of example. The cumulative value M of the cumulative value counter M is reset when the welding job of the particular day is to be started, and it is checked when the job of the day has ended. If the cumulative value on this occasion is small, it is not a serious problem. In contrast, when it is large, the reconsideration of the welding operation itself, such as re-teaching, is required. This is because the undesirable situation in which the operation is ceased is predicted to occur in the near future. At a step 25, the condition set at the step 13 is restored to a common welding condition. At a step 26, the ordinary welding treatment is carried out. Thus, the expected arc welding is performed while the welding torch 200 is held progressing from the welding start expectation point S to the welding end expectation point E along the welding expecation line l.

The comparing constant $N_{max}$ for use at the step 20 is, for example, 8. The retry counter N increments from 0 (zero), and when the arc start is impossible in spite of the tenth content of 9, it is judged that the welding is impossible, and the subsequent retry is not done. Meantime, the welding torch moves from the welding start expectation point S by 5-20 mm, so that it is returned to the original position at the next step 27. Also at this time, the positional data stored at the step 15 is used. At the step 28, the robot proper 100 is stopped, and the error to the effect that the operation has failed in the arc start is indicated on the display screen of the control panel 300. Here, a repair by a manual operation is awaited.

Figure 4:
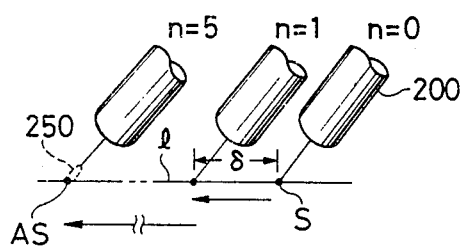
FIGS. 4-8 are explanatory views for elucidating the motions etc. of a welding torch at various steps in FIG. 1.
Figure 5:
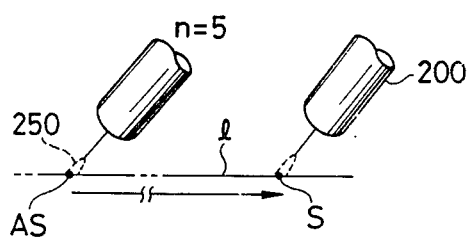
Figure 6:
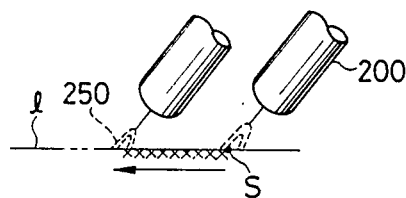
Figure 7:
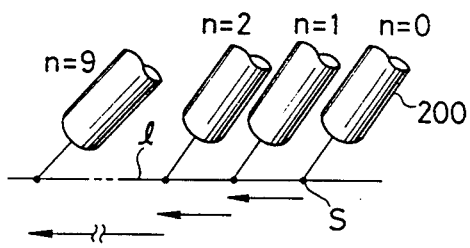
Figure 8:
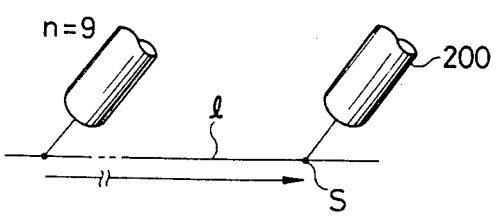

The motions of the welding torch 200 complying with the program of FIG. 1 are exemplified in FIGS. 4-8. The welding torch is assumed to fail in the arc start when the count N of the retry counter is 0(zero), and also when the retry counter counts N are 1 and 2. If the electric arc 250 has struck as shown in FIG. 4 when the retry counter count N is 5, then the corresponding position becomes the arc start point AS. The welding torch 200 is returned from the arc start point AS to the welding start expectation point S as shown in FIG. 5. Meantime, the return accompanies the welding of the workpiece 400 in order to keep the electric arc 250. Thereafter, as shown in FIG. 6, the welding treatment is executed anew from the welding start expectation point S and along the welding expectation line l whose start point is the expectation point S. A section from the welding start expectation point S to the arc start point AS is welded double by the two reciprocal movements. Meanwhile, it is sometimes the case that, as shown in FIG. 7, no electric arc strikes even when the count N of the retry counter has become 9. This is a case where the retry done as the surface of the workpiece is being shaved with the welding wire is not successful. on arc retry, welding wire may be retracted each time and protruded anew on each occasion this is considered besides a method in which the welding wire is advanced while being pressed against the workpiece. Both are intended to break down the oxide film of the surface and to expose an internal conductive surface. In the case of FIG. 7, it is judged that the welding is impossible, and the welding torch 200 is reset from the position of the retry counter content N=9 to welding start expectation point S as shown in FIG. 8.

In returning the welding torch 200 from the arc start point AS to the welding start expectation point S in Fig. 5, the electric arc 250 is kept, but this is not for the welding as a matter of course. It is accordingly desirable to narrow down the electric arc 250 to the utmost lowest level for return as long as it does not disappear. This may be met, for example, in such a way that the welding condition conforming to the above intention is set at the step 13 in FIG. 1 and that the rated welding condition is reset at the later step 25.

While the present invention has been described above in conjunction with the illustrated embodiments, it is not restricted to these embodiments but can be variously modified.

What I claim is:

1. A method wherein a welding torch is attached to a front end of an arm of an industrial robot, and the industrial robot is moved on the basis of teaching data taught beforehand, thereby to automatically weld a workpiece, comprising the step of causing a welding torch to progress from a welding start expectation point on the workpiece and along a welding expectation line whose start point is the welding start expectation point, the step of executing an arc start in the course of the pregression, the step of causing said welding torch to retrogress from an arc start point where an electric arc has been actually struck, to the welding start expectation point while the electric arc is kept, and the step of causing said welding torch to progress again from the welding start expectation point along the welding expectation line while the electric arc is kept.

2. An automatic welding method as defined in claim 1, wherein a number of times of the arc start execution for a unit welding section is recorded, and the arc starts are repeatedly executed until the number of times reaches a prescribed value.

3. An automatic welding method as defined in claim 2, wherein said welding torch is caused to retrogress from the arc start point to the welding start expectation point by the use of positional data which has been stored in the course of the progression of said welding torch from the welding start expectation point to the arc start point.

4. An automatic welding method as defined in claim 3, wherein:
   a number of times of the arc start execution in a plurality of unit welding sections are accumulated and stored; and
   the arc starts are repeatedly executed under a condition of a pilot electric arc which is lower than a rated value in at least one of an arc voltage and an arc current.

5. An automatic welding method as defined in claim 2, wherein the arc starts are repeatedly executed under a condition of a pilot electric arc which is lower than a rated value in at least one of an arc voltage and an arc current.

6. An automatic welding method as defined in claim 5, wherein a number of times of the arc start execution in a plurality of unit welding sections are accumulated and stored.

7. An automatic welding method as defined in claim 5, wherein said welding torch is caused to retrogress from the arc start point to the welding start expectation point by the use of positional data which has been stored in the course of the progression of said welding torch from the welding start expectation point to the arc start point.

8. An automatic welding method as defined in claim 1, wherein said welding torch is caused to retrogress from the arc start point to the welding start expectation point by the use of positional data which has been stored in the course of the progression of said welding torch from the welding start expectation point to the arc start point.

9. An automatic welding method as defined in claim 8, wherein a number of times of the arc start execution in a plurality of unit welding sections are accumulated and stored.

10. An automatic welding method as defined in claim 1, wherein a number of times of the arc start execution in a plurality of unit welding sections are accumulated and stored.

11. An automatic welding method as defined in claim 1, wherein the arc starts are repeatedly executed under a condition of a pilot electric arc which is lower than a rated value in at least one of an arc voltage and an arc current.

12. An automatic welding apparatus comprising means for causing a welding torch to progress from a welding start expectation point on a workpiece and along a welding expectation line whose start point is the welding start expectation point, means for executing arc starts repeatedly in the course of the progression, means for causing said welding torch to retrogress from an arc start point where an electric arc has been actually struck, to the welding start expectation point while the electric arc is kept, and means for causing said welding torch to progress again from the welding start expectation point along the welding expectation line while the electric arc is kept.

13. An automatic welding apparatus according to claim 12, further including means for determining and storing the number of times of the arc start execution for a unit welding section; and
   means for terminating the execution of arc starts when the number of stored arc starts reaches a prescribed value.

14. An automatic welding apparatus according to claim 13, further comprising:
   means for storing the positional data during the progression of the welding torch from the welding start expectation point to the arc start point during executing of arc starts, and wherein said means for causing said welding torch to retrogress employs the stored positional data.

15. An automatic welding apparatus according to claim 13, further comprising:
   means for accumulating and storing the number of times of the arc start execution in a plurality of unit welding sections.

16. An automatic welding method as defined in claim 12, further comprising:
   means for storing the positional data during the progression of the welding torch from the welding start expectation point to the arc start point during executing of arc starts, and wherein said means for causing said welding torch to retrogress employs the stored positional data.

* * * * *